United States Patent
Weil et al.

[15] 3,668,242
[45] June 6, 1972

[54] HALOGENATED PHENOXY COMPOUNDS

[72] Inventors: Edward D. Weil, Yonkers; Jerome Linder, Westfield, both of N.J.

[73] Assignee: Hooker Chemical Corporation, Niagara Falls, N.Y.

[22] Filed: May 1, 1969

[21] Appl. No.: 821,106

Related U.S. Application Data

[62] Division of Ser. No. 635,929, Dec. 2, 1966, Pat. No. 3,443,016, which is a division of Ser. No. 233,873, Oct. 29, 1962, Pat. No. 3,347,929.

[52] U.S. Cl. .................260/521 A, 260/471 R, 260/473 G, 260/520, 260/559 B, 424/331
[51] Int. Cl. ...........................................................C07c 65/02

[58] Field of Search ...........260/521 A, 473 G, 471 R, 518 A, 260/520, 559 B

[56] References Cited

OTHER PUBLICATIONS

Weil et al. J. Org Chem. Vol. 28 (9) p. 2,218– 2,225 (1963).

*Primary Examiner*—Lorraine A. Weinberger
*Assistant Examiner*—Paul J. Killas
*Attorney*—Peter F. Casella, Donald C. Studley, Richard P. Mueller, James F. Mudd and William J. Schramm

[57] ABSTRACT

Unsaturated halogenated phenoxy compounds are described. They are prepared by opening the corresponding halogenated phenoxy cycopentenones and are employed as herbicides.

6 Claims, No Drawings

HALOGENATED PHENOXY COMPOUNDS

CROSS REFERENCE

This application is a division of Ser. No. 635,929, filed Dec. 2, 1966 now U.S. Pat. No. 3,443,016 issued May 6, 1969 which was a division of Ser. No. 233,873, filed Oct. 29, 1962, now U.S. Pat. No. 3,347,929, issued Oct. 17, 1967.

INCORPORATION BY REFERENCE

Reference is hereby made to U.S. Pat. Nos. 3,347,929 and 3,443,016. All subject matter therein is incorporated herein by reference.

SUMMARY OF INVENTION

Unsaturated halogenated phenoxy compounds are prepared by ring opening the corresponding halogenated phenoxy cyclopentenones with a base. The compounds resulting from said ring opening are useful as herbicidal compounds.

What is claimed is:

1. A compound having the formula

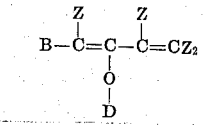

wherein

B is selected from the group consisting of

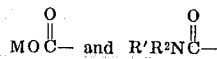

Z is a halogen of atomic weight between 35 and 81;
D is selected from the group consisting of

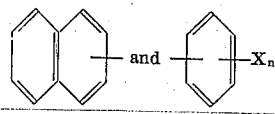

M is selected from the group consisting of hydrogen, alkali metal, and alkyl
$R^1$ and $R^2$ are selected from the group consisting of hydrogen, alkyl and aryl
X is selected from the group consisting of halogen, nitro, phenyl, alkoxy and carboxy,
$n$ is from 0 to 5.

2. A compound having the formula

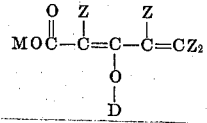

wherein
Z is a halogen of atomic weight between 35 and 81;
D is selected from the group consisting of

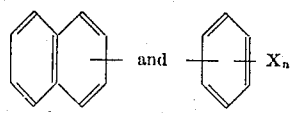

M is selected from the group consisting of hydrogen, alkali metal, and alkyl
X is selected from the group consisting of halogen, nitro, phenyl, alkoxy, and carboxy
$n$ is from 0 to 5.

3. A compound of claim 2 having the structure

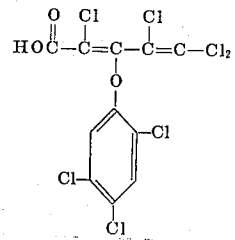

4. A compound of claim 1 having the structure

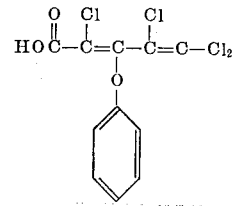

5. A compound of claim 2 having the structure

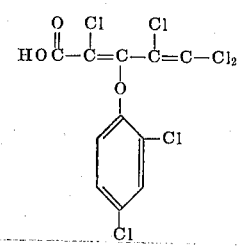

6. A compound of claim 2 having the structure

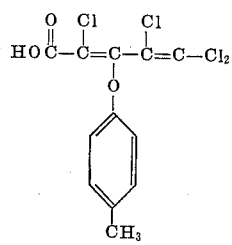

* * * * *